(12) United States Patent
Lee et al.

(10) Patent No.: US 10,802,144 B2
(45) Date of Patent: Oct. 13, 2020

(54) METHOD AND DEVICE OF MEASURING THE DISTANCE TO AN OBJECT

(71) Applicant: SAMSUNG ELECTRONICS CO., LTD., Suwon-si, Gyeonggi-Do (KR)

(72) Inventors: Han-Soo Lee, Hwaseong-si (KR); Hae-Kyung Kong, Yongin-si (KR); Kyung-Il Kim, Anyang-si (KR); Min-Seok Oh, Osan-si (KR); Tae-Chan Kim, Yongin-si (KR); Moo-Sup Lim, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 1024 days.

(21) Appl. No.: 15/333,568

(22) Filed: Oct. 25, 2016

(65) Prior Publication Data

US 2017/0038472 A1 Feb. 9, 2017

Related U.S. Application Data

(62) Division of application No. 13/893,812, filed on May 14, 2013, now Pat. No. 9,500,477.

(30) Foreign Application Priority Data

Jun. 29, 2012 (KR) .......................... 10-2012-0070908

(51) Int. Cl.
*G01C 3/08* (2006.01)
*G01S 17/36* (2006.01)

(52) U.S. Cl.
CPC ................ *G01S 17/36* (2013.01); *G01C 3/08* (2013.01)

(58) Field of Classification Search
CPC .................................. G01S 17/36; G01S 7/08
USPC ......................................................... 356/5.01
See application file for complete search history.

(56) References Cited

U.S. PATENT DOCUMENTS

| 8,988,661 | B2* | 3/2015 | Hills | G01C 3/08 356/5.01 |
|---|---|---|---|---|
| 2004/0036851 | A1* | 2/2004 | Hunter | G01P 3/68 356/5.01 |
| 2006/0044438 | A1 | 3/2006 | Mauritzson | |
| 2006/0128087 | A1 | 6/2006 | Bamji et al. | |
| 2009/0001255 | A1 | 1/2009 | Hong | |
| 2011/0102644 | A1 | 5/2011 | Posamentier | |
| 2011/0134078 | A1* | 6/2011 | Hsu | G01C 3/08 345/175 |
| 2011/0260038 | A1 | 10/2011 | Hirotsu et al. | |

(Continued)

*Primary Examiner* — Mark Hellner
(74) *Attorney, Agent, or Firm* — F. Chau & Associates, LLC

(57) ABSTRACT

A method of measuring the distance to an object by radiating a periodic amplitude-modulated optical signal to the object and detecting the phase difference between the radiated optical signal and a reflected optical signal from the object includes: generating a first photo-detection control signal to control the periodic amplitude-modulation of the radiated optical signal; generating a mask signal activated at least during a shuttering duration for resetting the voltage level at a sensing node; and generating a second photo-detection control signal based on Boolean combination of the first photo-detection signal and the mask signal such that the second photo-detection signal is deactivated or masked at least during the shuttering duration.

6 Claims, 21 Drawing Sheets

(56) References Cited

U.S. PATENT DOCUMENTS

| | | | |
|---|---|---|---|
| 2011/0304841 A1* | 12/2011 | Bamji | G01C 3/08 356/5.01 |
| 2011/0309232 A1 | 12/2011 | Lyu | |
| 2014/0002636 A1 | 1/2014 | Lee et al. | |

* cited by examiner

METHOD AND DEVICE OF MEASURING THE DISTANCE TO AN OBJECT

CROSS-REFERENCE TO RELATED APPLICATION(S)

This application is a divisional application of co-pending U.S. application Ser. No. 13/893,812 filed May 14, 2013, which claims priority under 35 U.S.C. § 119 to Korean Patent Application No. 10-2012-0070908, filed on Jun. 29, 2012, in the Korean Intellectual Property Office (KIPO), the disclosures of which are incorporated by reference herein in their entireties.

TECHNICAL FIELD

Exemplary embodiments relate to depth measurement, and more particularly to a method and a device of measuring the distance to multiple points on an object using a time-of-flight (ToF) scheme.

DISCUSSION OF THE RELATED ART

Sensors may sense a state of an object, and convert the sensed result to an electric signal to provide information about the object. For example, the sensors may include a light sensor, a temperature sensor, a pressure sensor, a magnetic sensor, a depth sensor, etc. A time-of-flight (ToF) depth sensor can measure the distance to an object by detecting the delay time corresponding to the phase difference between a radiated optical signal to the object and a reflected optical signal from the object. A Time-of-Flight Camera (ToF camera) is a range imaging camera system that resolves distance based on the known speed of light, measuring the time-of-flight of a light signal between the camera and the subject for each point of the image.

A time-of-flight camera includes an illumination unit that illuminates object(s) in the scene. The illumination signal may be intensity-modulated with a cosine signal of frequency $f_{mod}$. Usually the emitted light is in the non-visible near infrared range of the spectrum. The light signal travels with constant speed in the surrounding medium and is reflected by the surface of the object. By estimating the phase-shift $\Phi_d$ (in radians) between both, the emitted and reflected light signal, the distance d can be computed as:

$$d = \frac{c}{2 f_{mod}} \cdot \frac{\phi_d}{2\pi}$$

where c [m/s] denotes the speed of light, d [meters] is the distance the light travels, $f_{mod}$ [MHz] is the modulation frequency, $\Phi_d$ [radians] is the phase shift. To compute distances, the ToF camera evaluates the phase shift between a reference (emitted) signal and the received signal. The phase shift $\Phi_d$ is proportional to the distance d. The light has to be modulated with high speeds up to 100 MHz, and thus only LEDs or laser diodes are fast enough. The illumination can use infrared light and an image sensor having a bandpass filter to make the illumination unobtrusive. Radio-frequency (RF) modulated light sources can be used in conjunction with phase detectors. Photonic Mixer Devices (PMD) work by modulating the outgoing beam with an RF carrier, then measuring the phase shift of that carrier on the receiver side.

Range gated devices have a shutter that opens and closes at the same rate as the light pulses are sent out. Because part of every returning pulse is blocked by the shutter according to its time of arrival, the amount of light received relates to the distance the pulse has traveled. The distance can be calculated using the equation, z=R (S2−S1)/2(S1+S2)+R/2 for an ideal camera. R is the camera range, determined by the round trip of the light pulse, S1 the amount of the light pulse that is received, and S2 the amount of the light pulse that is blocked.

SUMMARY

Aspects of the present inventive concept provide a method and a device for measuring the distance or the depth to an object, capable of enhancing the reliability of measured data.

In a method of measuring the distance to an object by generating a periodic amplitude-modulated optical signal, radiating the periodic amplitude-modulated optical signal to the object and detecting the phase difference $\Phi_d$ (in the amplitude) between the radiated optical signal and the reflected optical signal reflected back from the object, a first photo-detection control signal is generated to control the radiation of the optical signal. A mask signal is generated such that the mask signal is activated at least during a shuttering duration for resetting the voltage level at a sensing node (associated with an operation of a previous frame). A second photo-detection control signal is generated based on the first photo-detection signal and the mask signal such that the second photo-detection signal is deactivated or masked at least during the shuttering duration.

The distance to the object may be measured with higher accuracy using correlated double sampling (CDS) to compensate the detected phase difference (phase shift $\Phi_d$) for a reset voltage level.

The mask signal may be further activated at least during an activated duration of a reset control signal to detect the reset voltage level.

The CDS may include a first duration for detecting a signal voltage level at the sensing node, the signal voltage level being associated with the reflected optical signal, and a second duration for activating a reset control signal to reset the sensing node, and a third duration for detecting the reset voltage level at the sensing node.

The mask signal may be further activated at least during the first duration, the second duration and the third duration.

After generating the second photo-detection control signal, an electric charge corresponding to the reflected optical signal may be transferred to the sensing node using the second photo-detection control signal.

According to exemplary embodiments, a device of measuring the distance to an object, the device radiating an optical signal to the object and detecting the phase difference between the radiated optical signal and a reflected optical signal from the object, includes a timing controller configured to generate a first photo-detection control signal to control the radiation of the optical signal and a mask signal that is activated at least during a shuttering duration for resetting the voltage level at a sensing node (associated with an operation of a previous frame), a photo-gate controller configured to generate a second photo-detection control signal based on the first photo-detection signal and the mask signal such that the second photo-detection signal is deactivated or masked at least during the shuttering duration, and a pixel array including a plurality of pixels, each pixel including a photo-gate that receives the second photo-detection signal to sense the reflected optical signal.

The device may further include a row decoder configured to receive a row control signal from the timing controller to generate a decoded row address, select a row of the pixel array in response to the decoded row address, and provide the decoded row address to the photo-gate controller.

The photo-gate controller may be configured to perform a logic operation on the decoded row address, the first photo-detection control signal and the mask signal to generate the second photo-detection control signal.

The device may further include a correlated double sampling (CDS) unit configured to perform CDS to compensate the detected phase difference for a reset voltage level.

The mask signal may be further activated at least during an activated duration of a reset control signal to detect the reset voltage level.

The CDS unit may be configured to detect a signal voltage level at the sensing node during a first duration, the signal voltage level associated with the reflected optical signal, activate a reset control signal to reset the sensing node during a second duration, and detect the reset voltage level at the sensing node during a third duration.

The mask signal may be further activated at least during the first duration, the second duration and the third duration.

The device may further include an analog-to-digital converter configured to convert an analog signal to a digital signal, the CDS unit outputting the analog signal.

The CDS unit may output a digital signal representing the distance(s) to the object.

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes and inter-distances of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

BRIEF DESCRIPTION OF THE DRAWINGS

Illustrative, non-limiting exemplary embodiments will be more clearly understood from the following detailed description taken in conjunction with the accompanying drawings; in which.

DETAILED DESCRIPTION OF THE EXEMPLARY EMBODIMENTS

Figure 1:
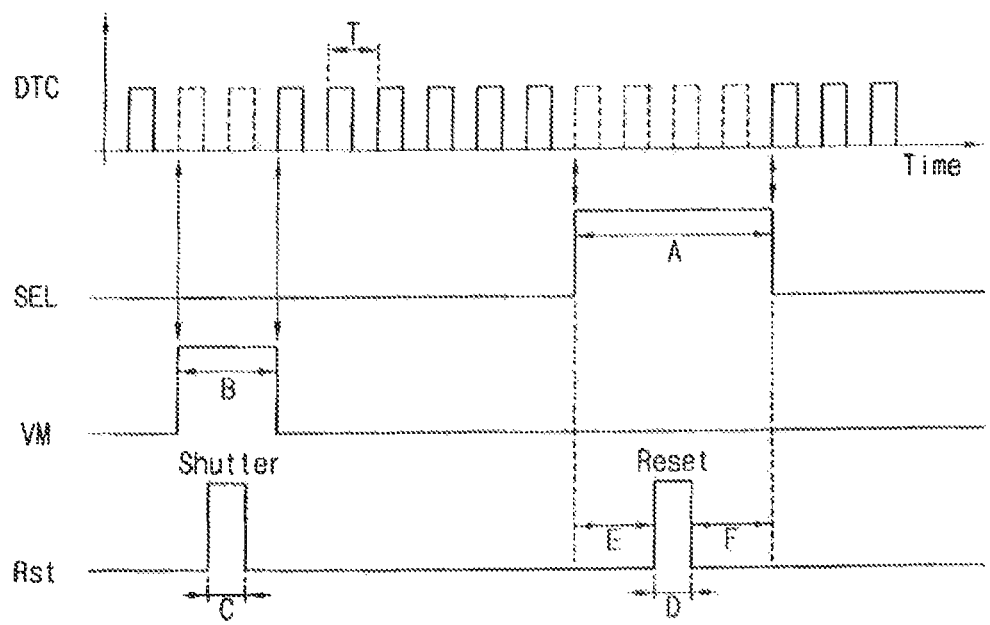
FIGS. 1 and 2 are timing diagrams illustrating operations of the depth sensor of FIG. 5 according to an exemplary embodiment.
Figure 5:
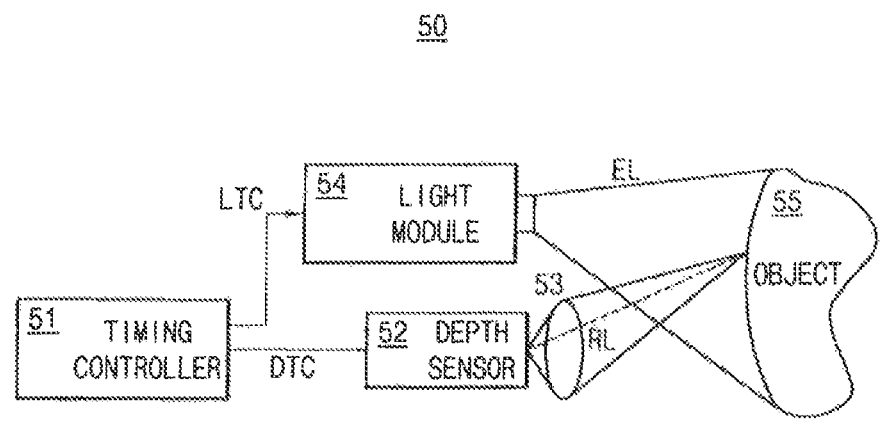
FIG. 5 is a conceptual diagram illustrating a distance measurement device according to an exemplary embodiment.

FIG. 1 is a timing diagram illustrating an operation of the depth sensor of FIG. 5 according to an exemplary embodiment.

Referring to FIG. 1, a photo-detection control signal DTC is generated with a uniform cyclic period T. The photo-detection control signal DTC is a signal used to detect an optical signal that is reflected from an object and incident on a pixel of a depth sensor. A cell select signal SEL has a logic high level during a predetermined duration A, for which data is output from the pixel.

A reset control signal Rst is a signal to remove previous information remaining in the pixel. For example, while the reset control signal Rst is in the logic high level, the charge in the sensing node (e.g., a floating diffusion node FD in FIG. 3A) of the pixel is discharged or drained by a high voltage such a power supply voltage VDD.

A shuttering duration C represents an operational time interval for resetting the voltage level at the sensing node (FD) to remove the remaining charge associated with an operation of a previous frame, when the depth sensor operates base on a per-frame unit repetition.

A resetting duration D represents an operational time interval for resetting the voltage level at the sensing node (FD) to detect a reset voltage level, when the depth sensor performs a correlated double sampling (CDS) operation. In this case, a signal voltage level, which is associated with the reflected optical signal, is detected at the sensing node (FD) during a first duration E, the reset control signal Rst is activated to reset the sensing node (FD) during a second duration D, that is, the resetting duration, and the reset voltage level is detected at the sensing node (FD) during a third duration F. The CDS operation will be further described below.

A mask signal or a virtual mask signal VM is activated at least during the shuttering duration C of the reset control signal Rst.

Typically the signal lines are disposed over the pixels to provide control signals to the pixels and output the detected data from the pixels. Such signal lines are formed with polysilicon or metal. For example, the two signal lines of the photo-detection control signal DTC and the reset control signal Rst may be disposed close to each other with a predetermined interval in the vertical direction or in the horizontal direction. The close disposition of the signal lines may cause a coupling effect such that the voltage level of the one signal line may be distorted by the voltage level of the other signal line.

According to exemplary embodiments, to prevent or reduce the coupling effect, the virtual mask signal VM is activated at least during the shuttering duration C. In other words, the virtual mask signal VM may be activated, for example, in the logic high level, during the duration B to sufficiently include the shuttering duration C. The photo-detection control signal DTC may be masked, as represented by dotted lines in FIG. 1, during the duration B based on the virtual mask signal VM to reduce the coupling effect on the reset control signal Rst by the photo-detection control signal DTC.

In addition, the photo-detection control signal DTC may be further masked during the duration A while the cell select signal SEL is activated, for example, in the logic high level.

As illustrated in FIG. 1, the photo-detection control signal DTC may be masked at least during the shuttering duration C of the reset control signal Rst and may be further masked at least during the resetting duration D of the reset control signal Rst.

Figure 2:
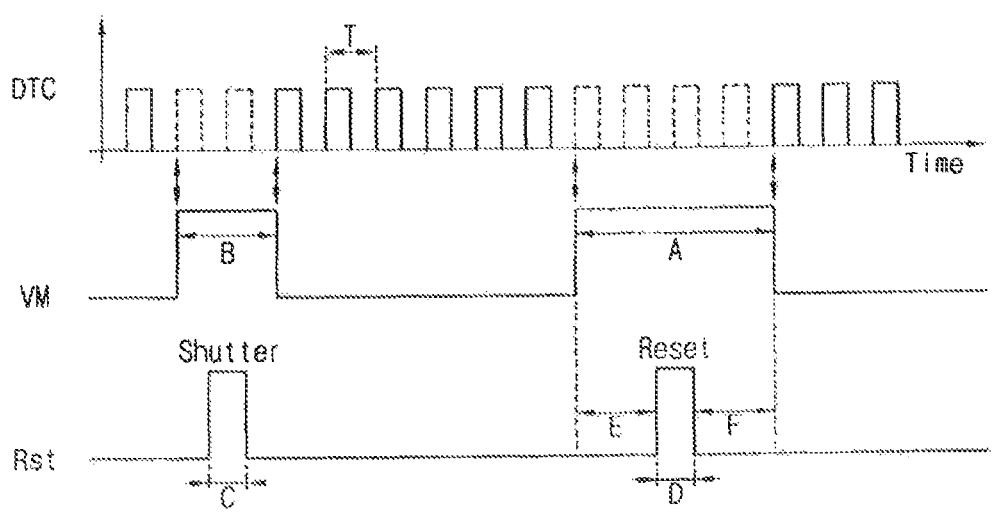

FIG. 2 is a timing diagram illustrating another operation of a depth sensor according to exemplary embodiments.

The cell select signal SEL in FIG. 1 is omitted in FIG. 2 and the operation of FIG. 2 is equal to the operation of FIG. 1 except the virtual mask signal VM. Referring to FIG. 2, the virtual mask signal VM is activated, for example, in the logic high level, at least during the resetting duration D of the reset control signal Rst in addition to at least during the shuttering duration C of the reset control signal Rst. The other descriptions are equal to the descriptions of FIG. 1, and the repeated descriptions are omitted.

The photo-detection control signal DTC may be masked based on the virtual mask signal VM and the cell select signal SEL in the embodiment of FIG. 1, whereas the photo-detection control signal DTC may be masked based on only the virtual mask signal VM in the embodiment of FIG. 2. In other words, the virtual mask signal VM in FIG. 2 may be considered as the Boolean sum of adding the virtual mask signal VM and the cell select signal SEL in FIG. 1.

In FIGS. 1 and 2, the original photo-detection control signal DTC before masking may be referred to as a first photo-detection control signal DTC1 and the masked photo-detection control signal DTC may be referred to as a second photo-detection control signal DTC2. In the embodiment of FIG. 1, the second photo-detection control signal DTC2 may be generated based on the first photo-detection control signal DTC1, the virtual mask signal VM and the cell select signal SEL. In the exemplary embodiment of FIG. 2, the second photo-detection control signal DTC2 may be generated based on the first photo-detection control signal DTC1 and the virtual mask signal VM.

Figure 3A:
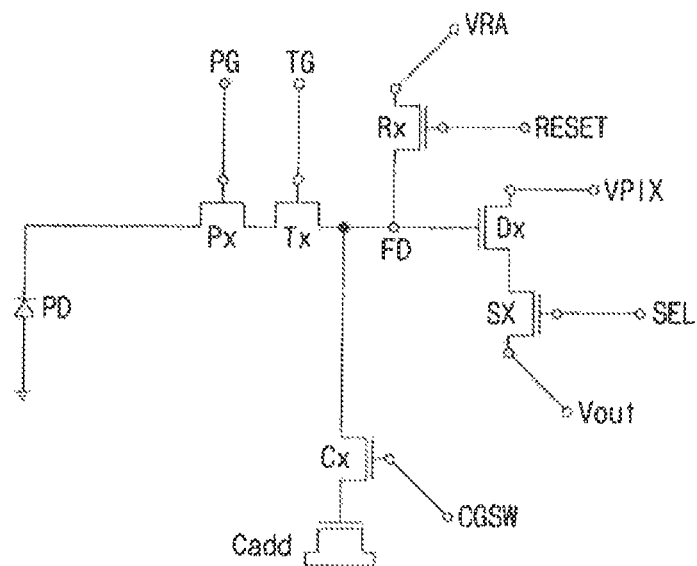
FIG. 3A is a circuit diagram of an exemplary depth-pixel in the depth sensor of FIG. 5.
Figure 3B:
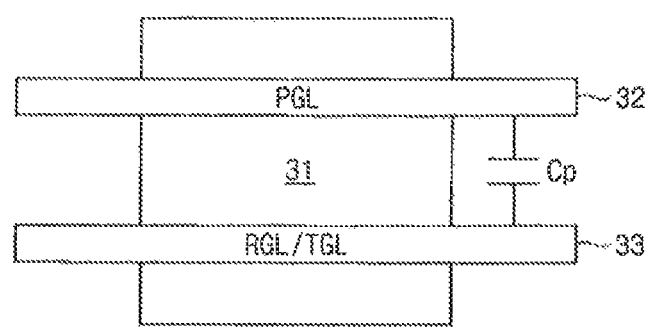
FIG. 3B is a diagram for describing a coupling effect between a photo-detection control signal line and another control signal line in the depth sensor of FIG. 5.

FIG. 3A is a circuit diagram of an exemplary depth-pixel 30 in the depth sensor 52 of FIG. 5. FIG. 3B is a diagram for describing a coupling effect between a photo-detection control signal line and another control signal line.

Referring to FIG. 3A, a depth-pixel 30 of a depth sensor 52 includes a photo-conversion element (e.g., photodiode) PD, a photo transistor Px, a transfer transistor Tx, a control transistor Cx, a reset transistor Rx, a drive transistor Dx, and a select transistor Sx.

The gate electrode of the photo transistor Px is controlled by a photo gate signal PG and the gate of the transfer transistor Tx is controlled by a transfer gate signal TG. The photo gate signal PG or the transfer gate signal TG may correspond to the photo-detection control signal DTC as described with reference to FIGS. 1 and 2.

Depending on the operation scheme of the pixel 30, the transfer gate signal TG may always have a logic high level so that the transfer transistor Tx may always maintain the turned-ON state during operation. In this case, the photo transistor Px is controlled by the photo gate signal PG corresponding to the photo-detection control signal DTC as described with reference to FIGS. 1 and 2.

In contrast, the transfer gate signal TG for controlling the transfer transistor Tx may not maintain the logic high level but may be selectively activated in the logic high level only when the photo-charge generated in the photo-conversion element PD is transferred to a floating diffusion node FD configured to serve as the above-mentioned sensing node. In this case, the photo transistor Px is controlled by the photo gate signal PG corresponding to the photo-detection control signal DTC as described with reference to FIGS. 1 and 2.

The gate electrode of the reset transistor Rx is controlled by a reset signal RESET corresponding to the reset control signal Rst as described with reference to FIGS. 1 and 2. The gate electrode of the select transistor Sx is controlled by the cell select signal SEL as described with reference to FIGS. 1 and 2.

The photo transistor Px may be omitted in various alternative pixel structures. In that case, the transfer gate signal TG may be replaced with the photo gate signal PG and the gate electrode of the transfer transistor Tx may be controlled by the photo gate signal PG corresponding to the photo-detection control signal DTC as described with reference to FIGS. 1 and 2.

A control transistor Cx is coupled between the sensing node FD and a capacitor Cadd as illustrated in FIG. 3A. The capacitor Cadd performs correlated double sampling (CDS) according to the control signal CDSC. The gain of the pixel 30 may be controlled by adjusting the capacitance of the capacitor Cadd and/or the voltage level of the control gate signal CGSW that is applied to the gate of the control transistor Cx.

Referring to FIG. 3B, the pixel 30 of the depth sensor includes a (semiconductor) photo-conversion element 31 and the signal lines disposed over the photo-conversion element 31. The signal lines include a photo gate signal line PGL 32 and a reset or transfer gate signal line RGL/TGL 33.

The photo gate signal line PGL transfers the photo-detection control signal DTC that has a waveform of a clock signal of a uniform cyclic period (as shown in FIGS. 1 and 2). The reset or transfer gate signal line RGL/TGC transfers the signal that is activated in the logic high level during the predetermined duration. The close disposition of the signal lines may cause the capacitive coupling effect between the signals lines when the signal on the reset or transfer gate signal line RGL/TGC is activated in the logic high level. The coupling effect may be represented by the parasitic capacitance Cp as illustrated in FIG. 3b.

Even though FIG. 3B does not illustrate the cell select signal line for transferring the cell select signal SEL, also the coupling effect may be caused between the photo gate signal line PGL and the cell select signal line when the cell select signal SEL is activated in the logic high level.

The capacitive coupling effect may reduce the voltage level actually applied to a drain electrode of the reset transistor Rx and thus the sensing node FD may not be reset sufficiently. Such insufficient reset may affect the detected reset voltage level and thus the depth information or the distance information may be distorted.

According to exemplary embodiments, the photo-detection control signal DTC transferred through the photo gate signal line PGL may be masked using the virtual mask signal VM while the signals transferred through the reset/transfer gate signal line RGL/TGL and/or the cell select signal line are activated in the logic high level. Through masking of the photo-detection control signal DTC, the coupling effect may be prevented or reduced.

Figure 4A:
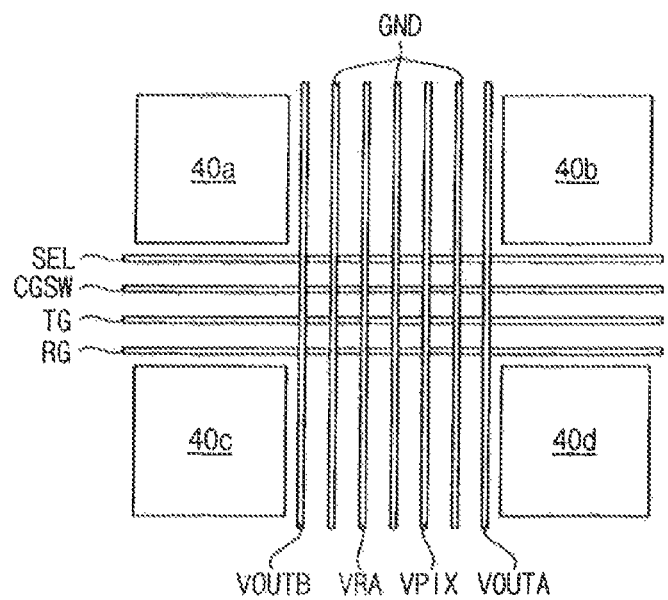
FIGS. 4A and 4B are diagrams illustrating example layouts of signal lines in the depth sensor of FIG. 5.
Figure 4B:
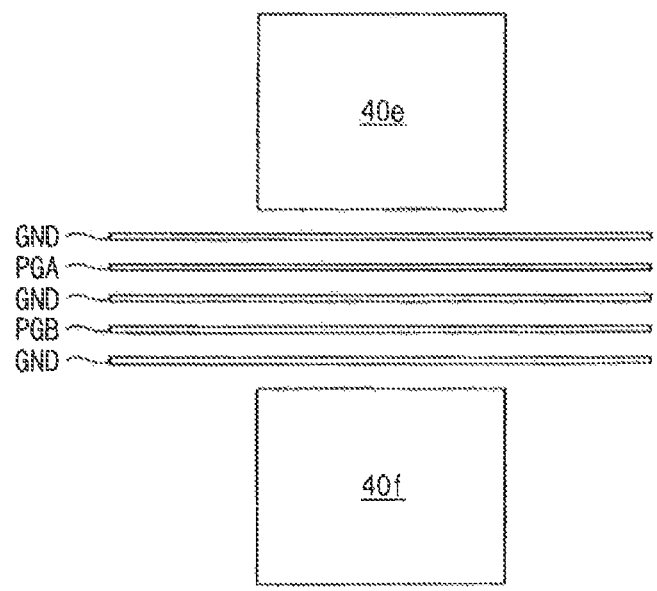

FIGS. 4A and 4B are diagrams illustrating example layouts of signal lines in a depth sensor.

FIG. 4A illustrates first signal lines and FIG. 4B illustrates second signal lines over the first signal lines. For example, the first and second signal lines may be metal lines patterned in a plurality of metal layers over a semiconductor substrate. The layouts in FIGS. 4A and 4B may be an example associated with two-tap pixel of the depth sensor.

Referring to FIG. 4A, four photo-conversion elements 40a, 40b, 40c and 40d may be formed in the semiconductor substrate and a plurality of signal lines may be disposed over the semiconductor substrate. The constant voltage lines VOUTA, VOUTB, VPIX, VRA and GND may be extended in the column direction and the dynamically-changing voltage control signal lines SEL, CGSW, TG and RG may be extended in the row direction.

VOUT and VOUTB indicate the two output lines associated with the two-tap pixel, VRA indicates the voltage line coupled to the drain electrode of the reset transistor, VPIX indicates the voltage line coupled to the drain electrode of the drive transistor and GND indicates the ground voltage line.

SEL indicates a cell select signal line, CGSW indicates a control gate signal line, TG indicates the transfer gate signal line and RC indicates the reset gate signal line.

Referring to FIG. 4B, two photo-conversion elements 40e and 40f may be formed in the semiconductor substrate and a plurality of signal lines may be disposed over the semiconductor substrate and extended in the row direction. PGA and PGB indicate the photo gate signal lines to transfer the photo-detection control signal DTC. In case of the two-tap pixel, the two photo gate signal lines PGA and PGB may both be disposed. For example, PGA and PGB may transfer respectively the photo-detection control signals DTCs having opposite phases, (i.e., having a phase difference of 180 degrees).

The second signal lines in FIG. 4B may be disposed over the first signal lines in FIG. 4A. Accordingly the photo gate signal lines PGA and PGB may be overlapped with the transfer gate signal line TG and the reset gate signal line and thus the above-mentioned capacitive coupling effect may occur between the signal lines that are disposed adjacent to each other in the vertical direction.

Figure 6:
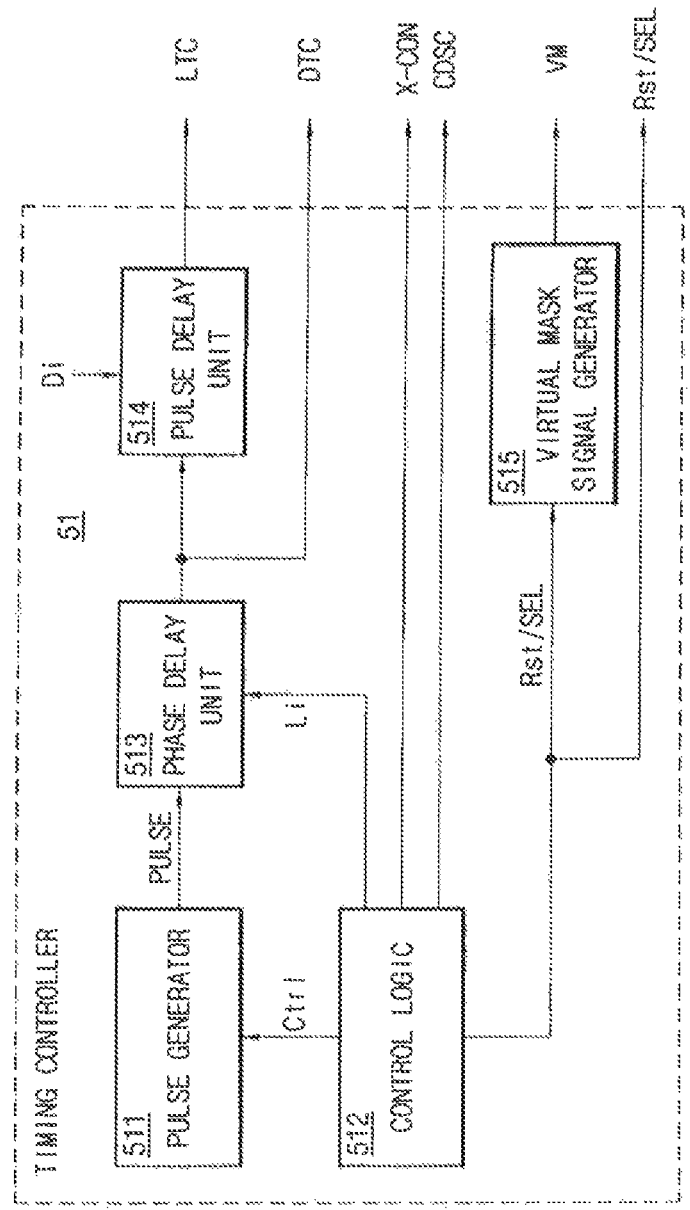
FIG. 6 is a block diagram illustrating a timing controller in the distance measurement device of FIG. 5.
Figure 7:
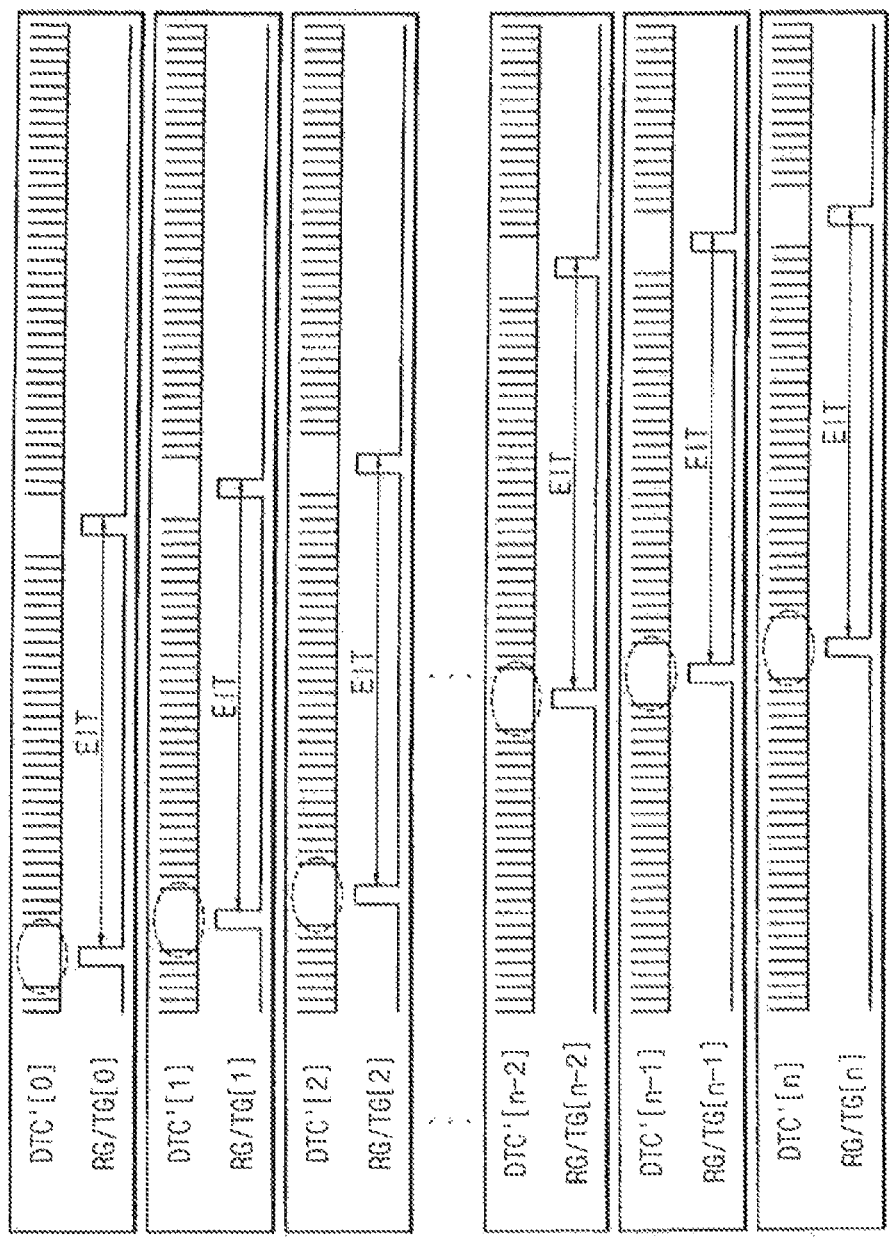
FIG. 7 is a timing diagram illustrating a photo-detection control signal and a reset gate control signal in the distance measurement device of FIG. 5.

FIG. 5 is a block diagram of a distance measurement device according to an exemplary embodiment, FIG. 6 is a block diagram of the timing controller 51 in the distance measurement device of FIG. 5, and FIG. 7 is a timing diagram illustrating a photo-detection control signal and a reset gate control signal in the timing controller 51 in the distance measurement device of FIG. 5.

Referring to FIG. 5, the distance measurement device 50 includes a timing controller 51, a depth sensor 52, a lens 53 and a light module 54.

The timing controller 51 controls the operational timings of the depth sensor 52 and the light module 54. For the timing control, the timing controller 51 provides a light radiation control signal LTC to the light module 54 and the photo-detection control signal DTC to the depth sensor 52.

The light module 54 generates an amplitude-modulated optical signal EL based on the light radiation control signal LTC and radiates or emits the optical signal (emitted light) EL to an object 55. In a preferred embodiment, the amplitude-modulated optical signal EL is a pulse train generated by a pulse generator 511. The reflected optical signal (reflected light) RL from the object 55 is incident on the depth sensor 52 through the lens 53. The distance to the object 55 from the device 50 can be calculated using the following equation:

$$t_\Delta = \frac{2d}{c} \qquad \text{Equation 1}$$

In equation 1, $t_\Delta$ indicates the time of flight that corresponds to the time difference between the radiation time of the optical signal EL and the incidence time of the reflected optical signal RL, d indicates the distance from the device 50 to the object 55 and c indicates the constant speed of light. Thus time $t_\Delta$ is the time it takes the emitted light to travel (forward and return) over a distance 2d. The distance (vertical in FIG. 5) between the light the light module 54 and the depth sensor 52 is exaggerated in FIG. 5 relative to the distance d from the device 50 to the object 55.

In some exemplary embodiments, the depth sensor may be formed in a chip dedicated to measure only distance. In other exemplary embodiments, the depth sensor 52 may be formed with a color image sensor array in a chip to measure three-dimensional image information including distance information plus the conventional color image information. For example, the depth-pixels for detecting the distance information and color pixels for detecting the color image information may be formed in the same pixel array.

Referring to FIG. 6, the timing controller 51 includes a pulse generator 511, a control logic 512, delay units 513 and 514 and virtual mask signal generator 515.

The control logic 512 controls the pulse generator 511 through a control signal Ctrl. The control logic generates a row control signal X-CON and/or a correlated double sampling (CDS) control signal CDSC that are transferred to the row decoder and/or the CDS circuit disposed outside of the timing controller 51.

A pulse signal PULSE from the pulse generator 511 and a phase assignment signal Li from the control logic 512 are provided to the phase delay unit 513. The phase delay unit 513 divides the received pulse signal PULSE into a plurality of pulse signals and delays the pulse signals respectively based on the phase assignment signal Li to generate a sequence of pulse signals having different phases. The photo-detection control signal DTC output from the phase delay unit 513 is provided to the depth sensor 52 in FIG. 5. In addition, the photo-detection control signal DTC is provided to the pulse delay unit 514. The pulse delay unit 514 delays the photo-detection control signal DTC to generate the light radiation control signal LTC for synchronizing the photo-detection control signal DTC and the light radiation control signal LTC. The light radiation control signal LTC is provided to the light module 54 in FIG. 5. The pulse delay unit 514 determines the delay amount based on the (range) distance information Di of the object. The distance information Di may be provided by the control logic 512 or by another logic.

The control logic 512 also provides the reset control signal Rst and cell select signal SEL to the depth sensor 52 in FIG. 5 and the virtual mask signal generator 515. Even though the reset control signal Rst and cell select signal SEL are transferred through the same signal line in FIG. 6 for convenience of illustration, the reset control signal Rst and cell select signal SEL are different signals that are transferred through the respective signal lines.

The virtual mask signal generator 515 generates the virtual mask signal VM or the mask signal. The virtual mask signal VM is activated (e.g., preferably activated in the logic high level) at least during the shuttering duration C of the reset control signal Rst as illustrated in FIG. 1. The virtual mask signal VM is activated (e.g., in the logic high level) at least during the resetting duration D of the reset control signal Rst as well as at least during the shuttering duration C of the reset control signal Rst as illustrated in FIG. 2.

FIG. 7 illustrates operational timings of n+1 photo-detection control signals DTC'[0] through DTC'[n] and n+1 reset gate/transfer gate control signals RG/TG[0] through RG/TG[n] corresponding to the reset control signal Rst in FIGS. 1 and 2. The signals in FIG. 7 correspond to zero-th row through n-th row of the one frame operation, respectively. With the predetermined delay times between the rows, the sensed data and the reset data are output sequentially. Each of the reset gate/transfer gate control signals RG/TG[0] through RG/TG[n] has two pulses of the high voltage level. The first pulse corresponds to the shuttering operation and the second pulse corresponds to the resetting operation for detecting the reset voltage level of the sensing node FD. The time interval between the two pulses corresponds to an integration time EIT of the reflected optical signal RL.

Figure 8:
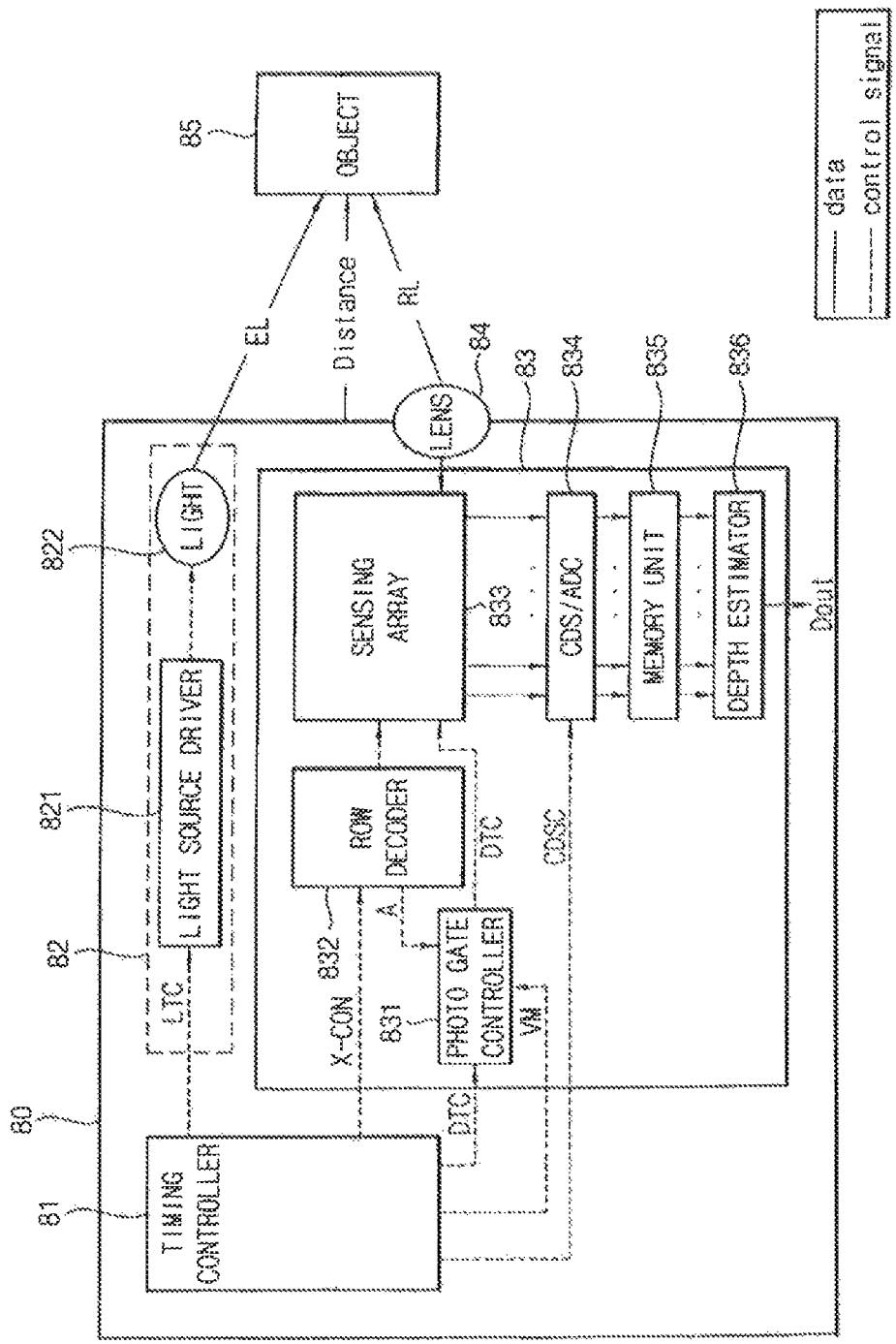
FIG. 8 is a block diagram illustrating a distance measurement device according to an exemplary embodiment.
Figure 9:
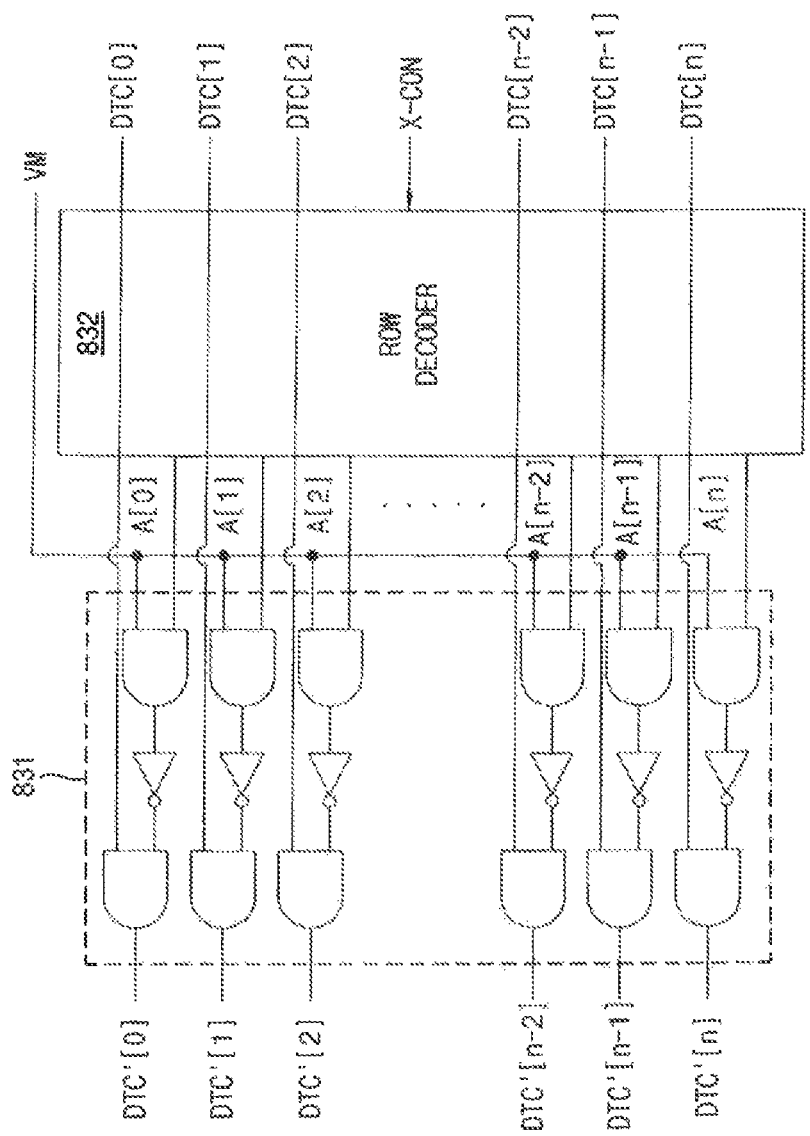
FIG. 9 is a circuit/block diagram of a row decoder and a photo gate controller in the distance measurement device of FIG. 8.
Figure 10:
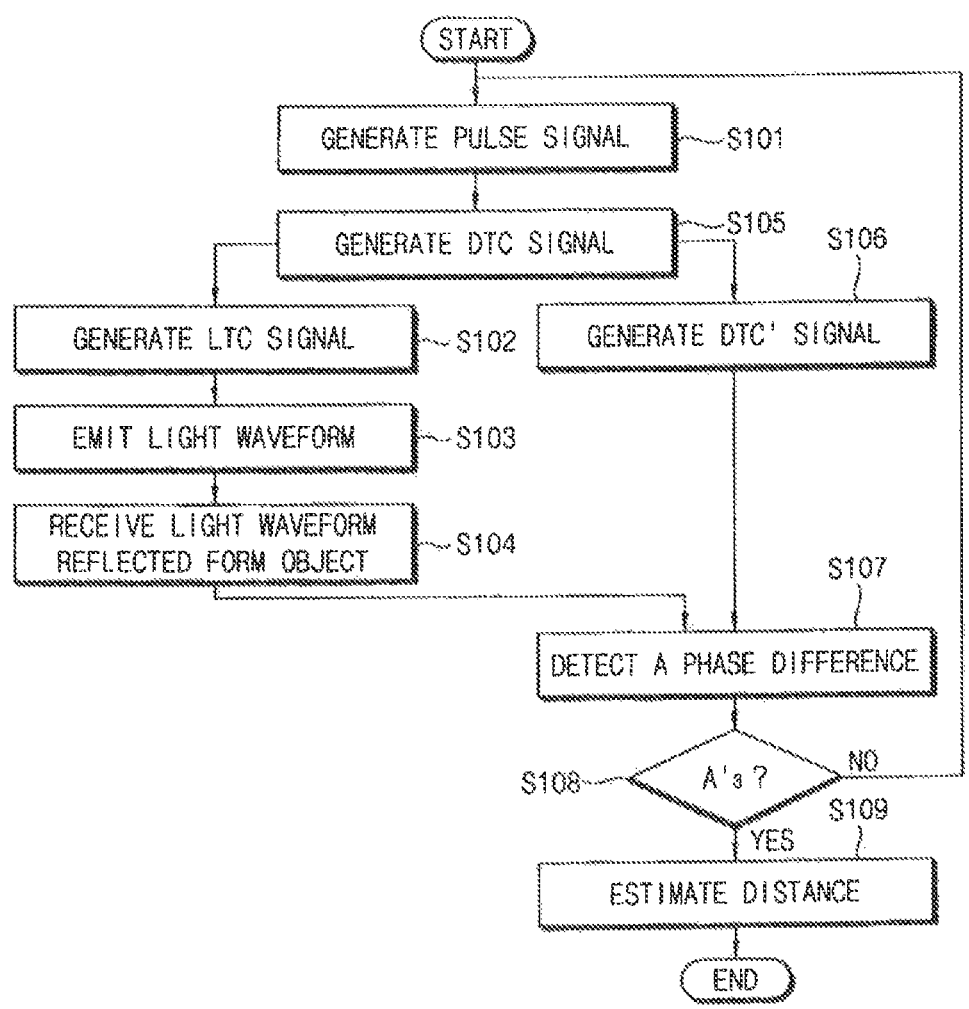
FIG. 10 is a flow chart illustrating a distance measurement method performed by the distance measurement device 80 of FIG. 8.

FIG. 8 is a block diagram illustrating a distance measurement device according to an exemplary embodiment, FIG. 9 is a circuit/block diagram of a row decoder and a photo gate controller in the distance measurement device 80 of FIG. 8, and FIG. 10 is a flow chart illustrating a distance measurement method performed by the distance measurement device 80 of FIG. 8.

Referring to FIG. 8, the distance measurement device 80 includes a timing controller 81, a light module 82, a depth sensor 83 and a lens 84. The timing controller 81 is the same as or similar to the timing controller 51 in FIG. 6 and the redundant description is omitted.

Referring to FIGS. 6 through 10, the pulse generator 511 in the timing controller 81 generates the pulse signal PULSE (step S101). The phase delay unit 513 in the timing controller 81 generates the photo-detection control signal DTC (step S105) based on the pulse signal from the pulse generator 511 and the phase assignment signal Li from the control logic 512. The photo-detection control signal DTC is provided to a photo gate controller 831 in the depth sensor 83. The generation of the photo-detection control signal DTC is further described with reference to FIG. 11. The virtual mask signal generator 515 in the timing controller 81 generates the virtual mask signal VM for masking the photo-detection control signal DTC at least during the logic high level duration of the reset control signal Rst and/or the cell select signal SEL.

The pulse delay unit 514 in the timing controller 81 receives the photo-detection control signal DTC from the phase delay unit 513 and generates the light radiation control signal LTC (step S102) based on the distance information Di. The light radiation control signal LTC is provided to a light source driver 821 in the light module 82.

The light module 82 includes a light source 822 and the light source driver 821 as illustrated in FIG. 8. The light source driver 821 generates a clock signal for driving the light source 822 based on the light radiation control signal LTC from the timing controller 81. The light source 822 generates the optical signal EL based on the clock signal from the light source driver 821 and radiates or emits the optical signal EL to the object 85 (step S103).

The light source 822 may include a light emitting diode (LED), an organic light emitting diode (OLED) an active-matrix organic light emitting diode (AMOLED), or a laser diode. For convenience of description, the waveform of the optical signal EL is assumed to be the same as the waveform of the light radiation control signal LTC. The optical signal may be a step wave (pulse train) or a sinusoidal (cosine) wave.

The reflected optical signal RL is incident on a sensing array or a pixel array 833 in the depth sensor 83 through the lens 84 (step S104). The lens 84 may include an infrared light filter in addition to the lens itself.

The depth sensor 83 converts the reflected optical signal RL to an electrical signal. The depth sensor 83 may include a photo gate controller 831, a row decoder 832, a pixel array 833, a correlated double sampling (CDS) and analog-to-digital conversion (ADC) circuit 834, a memory unit 835 and a depth estimator 836.

The row decoder 832 outputs a row address signal A[0~n] in response to the row control signal X-CON from the timing controller 81, to select one row among a plurality of rows of the pixel array 833. "Row" indicates a set of depth-pixels arranged in the x-direction in the pixel array 833.

The photo gate controller 831 generates a masked photo-detection control signal DTC' (step S106) based on the photo-detection control signal DTC, the virtual mask signal VM from the timing controller 81 and the row address signal A[0~n] from the row decoder 832. As described above, the unmasked photo-detection control signal DTC may be referred to as the first photo-detection signal and the masked photo-detection control signal DTC' may be referred to as the second photo-detection signal. The masked photo-detection control signal DTC' may correspond to the photo gate signal PG applied to the gate electrode of the photo transistor Px.

The masked photo-detection control signal DTC' may comprise the pulse signal including the pulse train but the pulses are masked or removed using the virtual mask signal VM at least during the shuttering duration C and the resetting duration D of the reset control signal Rst as illustrated in FIGS. 1 and 2.

Even though the photo gate controller 831 and the row decoder 832 are shown as being distinct elements in FIGS. 8 and 9, the photo gate controller 831 and the row decoder 832 may be formed indivisibly as one element.

FIG. 9 illustrates an exemplary embodiment of generating the masked photo-detection control signal DTC' through the row decoder 832 and the photo gate controller 831. As illustrated in FIG. 9, the photo gate controller 831 may include a plurality of AND gates and a plurality of inverters.

The photo-detection control signals DTC[0~n] and the row address signals A[0~n] are provided to the photo gate controller 831 and the photo gate controller 831 performs AND logic operations on the virtual mask signal VM, the photo-detection control signals DTC[0~n] and the row address signals A[0~n] to generate the masked photo-detection control signals DTC'[0~n].

As such, the masked photo-detection control signals DTC'[0~n] are generated by masking the photo-detection control signals DTC[0~n] with the virtual mask signal VM, and the masked photo-detection control signals DTC'[0~n] are then provided to the pixel array 833. When the sensing of the reflected optical signal RL is performed through the photo gate, the masked photo-detection signals DTC'[0~n] are provided as the photo gate signals.

The pixel array 833 includes a plurality (array) of depth-pixels. Each depth-pixel is operated to detect the phase difference (step S107) between the optical signal EL emitted by the light module 82 and the reflected optical signal RL from the object 85 received at the depth pixel.

The pixel array 833 output depth pixel signals based on the incident reflected optical signal RL. For example, in case of the one-tap depth pixel as will be described with reference to FIGS. 11 through 14, the steps S101 through S107 may be repeated until the output pixel signal corresponds to the forth pixel signal A'3 (step S108: YES). According to exemplary embodiments, at least one of the steps S101 through S107 may be repeated.

The CDS/ADC circuit 834 performs the CDS operation and the ADC operation to output the digital pixel signals A0 through A3, which will be further described with reference to FIGS. 12B through 15B. The CDS/ADC circuit 834 performs the CDS operation based on the CDS control signal CDSC from the timing controller 81 and the pixel signals from the depth-pixels.

The memory unit 835 may include buffers configured to store the digital pixel signals A0 through A3 output from the CDS/ADC circuit 834 by the frame unit.

The depth estimator 836 calculates the phase difference θ_hat (where 'hat' denotes the symbol ˆ) between the optical signal EL and the reflected optical signal EL based on the digital pixel signals A0 through A3 (step S109). The phase difference θ_hat may be represented as following Equation 2, where fm indicates the frequency of the amplitude-modulation of the optical signal EL and $t_A$ indicates the time of flight:

$$\hat{\theta} = 2\pi f_m t_\Delta = \tan^{-1} \frac{A_1 - A_3}{A_0 - A_2} \qquad \text{Equation 2}$$

The depth estimator 836 calculates the time of flight $t_A$ using Equation 2, and calculates the distance (depth) d_hat using following Equation 3:

$$\hat{d} = \frac{c}{4\pi f_m} \hat{\theta} \qquad \text{Equation 3}$$

The depth sensor 83 may be implemented as a charge coupled device (CCD) type or a CMOS image sensor (CIS) type. The configuration of FIG. 8 may be applied to the depth sensor of the CIS type. In case of the depth sensor of the CCD type, the configuration of FIG. 8 may be modified.

The ADC circuit may be varied depending on the type of CDS such as an analog CDS or a dual CDS. The ADC circuit may be implemented as the column ADC such that a converter is assigned to each column, or the signal ADC such that the common converter is assigned to the plurality of columns.

The depth sensor 83 and the timing controller 81 may be implemented in one chip. The depth sensor 83, the timing controller 81 and the lens 84 may be implemented as one module distinct from the light module 82.

The control logic 512 in the timing controller 81 generates the phase assignment signal Li as described with reference to FIGS. 6 and 8. The phase assignment signal Li may be used to respectively control the phases of the signals from the phase delay unit 513.

For example, the phase delay unit 513 in FIG. 6 may generate a first photo gate signal G0 based on a first phase assignment signal L0, a second photo gate signal G1 based on a second phase assignment signal L1, a third photo gate signal G2 based on a third phase assignment signal L2 and a fourth photo gate signal G3 based on a fourth phase assignment signal L3 such that the first photo gate signal G0 has the same phase with the original pulse signal PULSE, the second photo gate signal G1 has the phase difference of 90 degrees with respect to the original pulse signal PULSE, the third photo gate signal G2 has the phase difference of 180 degrees with respect to the original pulse signal PULSE and the fourth photo gate signal G3 has the phase difference of 270 degrees with respect to the original pulse signal PULSE.

For convenience of description, the waveform of the optical signal EL is assumed to be the same as the waveform of the light radiation control signal LTC in FIG. 8. The optical signal EL may have the waveform of a step wave (pulse train) or a sinusoidal wave.

The first through fourth photo gate signal G0 through G3 may be output to the pixel array 833 through the photo gate controller 831. The first through fourth photo gate signal G0 through G3 may correspond to the photo-detection control signal DTC' having the respective phases. The phases of the optical signal EL and the first photo gate signal G0 are equal to each other, the phase difference between the first and second photo gate signal G0 and G1 is 90 degrees, the phase difference between the first and third photo gate signal G0 and G2 is 180 degrees and the phase difference between the first and fourth photo gate signal G0 and G3 is 270 degrees.

In some exemplary embodiments, the pixel array 833 in the distance measurement device of FIG. 8 may include the depth-pixels of the one-tap structure. The configuration and the operation of the one-tap depth pixel are described with reference to FIGS. 11 through 14.

Figure 11:
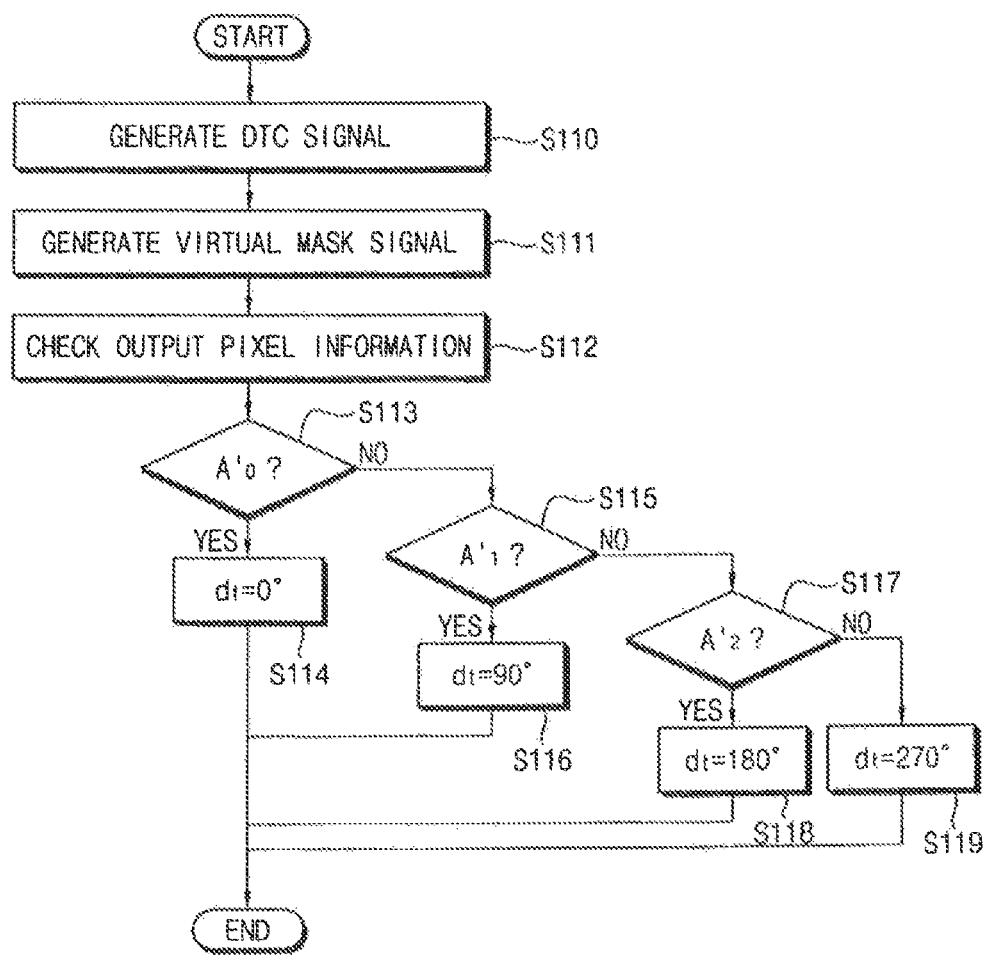
FIG. 11 is a flow chart illustrating an operation of a photo-gate controller to transfer a gate control signal to a one-tap depth pixel in the distance measurement device of FIG. 8.

FIG. 11 is a flow chart illustrating an operation of a photo-gate controller to transfer a gate control signal to an one-tap depth pixel in the distance measurement device of FIG. 8 according to an exemplary embodiment.

Referring to FIGS. 8, 10 and 11, the timing controller 81 generates the first photo detection signal DTC (step S110), which is unmasked, and generates the virtual mask signal VM (step S111). The photo gate controller 831 checks the output pixel information for sensing the distance d_hat (step S112).

If the checked information corresponds to the first pixel signal A0 (step S113: YES), the photo gate controller 831 outputs the first photo gate signal G0 having the same phase (dt=0°) as the optical signal EL (step S114). If the checked information corresponds to the second pixel signal A1 (step S115: YES), the photo gate controller 831 outputs the second photo gate signal G1 having the phase difference of 90 degrees (dt=90°) with respect to the optical signal EL (step S116). If the checked information corresponds to the third pixel signal A2 (step S117: YES), the photo gate controller 831 outputs the third photo gate signal G2 having the phase difference of 180 degrees (dt=180°) with respect to the optical signal EL (step S118). If the checked information corresponds to the fourth pixel signal A3 (step S117: NO), the photo gate controller 831 outputs the fourth photo gate signal G3 having the phase difference of 270 degrees (dt=270°) with respect to the optical signal EL (step S119).

Figure 12A:
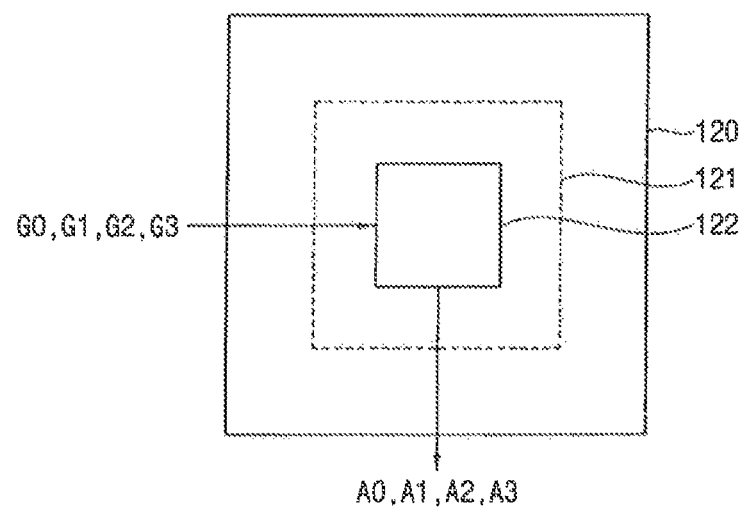
FIG. 12A illustrates an example layout of a one-tap depth pixel in the pixel array in FIG. 8.
Figure 12B:
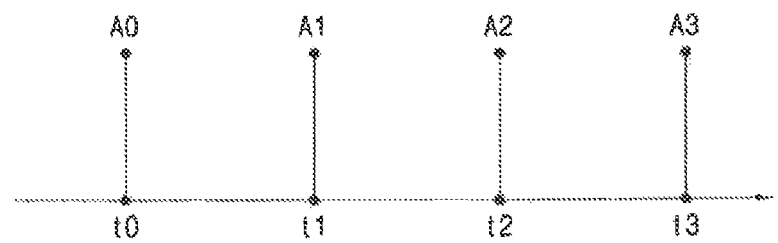
FIG. 12B is a diagram for describing phase differences between pixel signals sequentially detected by the one-tap depth pixel of FIG. 12A.

FIG. 12A illustrates an example layout of an one-tap depth pixel in the pixel array in FIG. 8, and FIG. 12B is a diagram for describing phase differences between pixel signals sequentially detected by the one-tap depth pixel of FIG. 12A.

The one-tap depth pixel 120 may include a photo-conversion element 122 such as a photodiode formed in an active region 121 of a semiconductor substrate. The transistors are formed in the active region 121 as illustrated in FIGS. 13A through 13D, and the number of the transistors in each active region 121 may be three, four, five or six. The photo gate signals G0, G1, G2 and G3 respectively having the phase differences of 0, 90, 180 and 270 degrees are provided sequentially to the photo-conversion element 122.

The photo-conversion element 122 performs the photo-conversion of the reflected optical signal RL based on the respective photo gate signals G0 through G3. In other words, the photo-conversion element 122 collects the photo-charges corresponding to the respective photo gate signals G0 through G3 and the collected photo-charges are transferred to the sensing node FD, respectively after the corresponding photo integration time intervals. The amounts of the accumulated photo-charge varies depending on the phases of the photo gate signals G0 through G3, and depending upon the phase difference θ_hat between the optical signal EL and the reflected optical signal EL. The phase difference θ_hat may be calculated using Equation 2 based on the pixel signals A0 through A3 corresponding to the measured amounts of the photo-charges that vary depending on the phases of the photo gate signals G0 through G3. The time of flight $t_A$ may be calculated using Equation 2 and the distance d_hat to the object may be calculated using Equation 1 or 3.

Referring to FIGS. 12A and 12B, the depth pixel 120 outputs the first pixel signal A0 at time t0 in response to the first gate signal G0 having the phase difference of 0 degree, outputs the second pixel signal A1 at time t1 in response to the second gate signal G1 having the phase difference of 90 degrees, outputs the third pixel signal A2 at time t2 in response to the third gate signal G2 having the phase difference of 180 degrees, and outputs the fourth pixel signal A3 at time t3 in response to the fourth gate signal G3 having the phase difference of 270 degrees.

FIGS. 13A through 13D are circuit diagrams illustrating examples of a pixel formed in an active region in FIG. 12A.

Figure 13A:
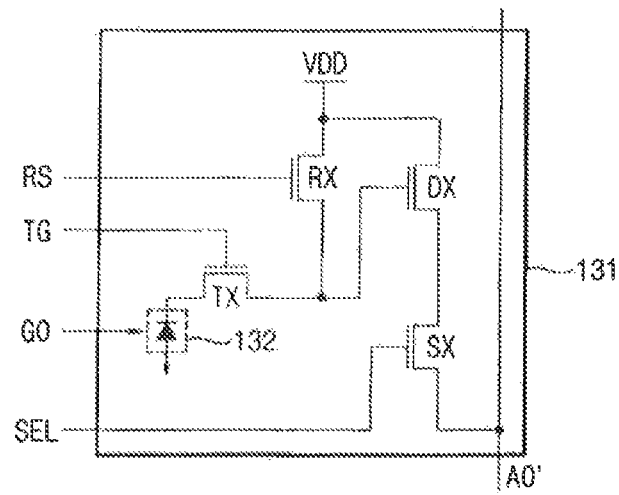
FIGS. 13A through 13D are circuit diagrams illustrating examples of a pixel formed in an active region in FIG. 12A.

Referring to FIG. 13A, a photo-conversion element 132 and four transistors RX, TX, DX and SX may be formed in the active region 131. The photo-conversion element 132 can collect the generated photo-charges in response to the photo gate signal G0. The photo-gate signal G0 may be sequentially changed to G1, G2 and G3 over time as described above. In the case that the photo-charges are photo-electrons, the photo-conversion element 132 can collect the photo-electrons while the photo gate signal G0 is in the logic high level and will not collect the photo-electrons while the photo gate signal G0 is in the logic low level.

The photo-conversion element 132 includes a photodiode, a photo transistor a photo gate and/or a pinned photodiode.

The reset transistor RX resets the sensing node FD with the voltage VDD in response to the reset control signal RS from the timing controller 51 in FIG. 6. The transfer transistor TX transfers the collected charges in the photo-conversion element 132 to the sensing node FD in response to the transfer gate signal TG. The drive transistor DX configured as the source follower transistor performs a buffering (and/or amplifying) operation in response to the charges in the sensing node FD. The select transistor SX outputs the pixel signal A0' from the drive transistor DX to the column line in response to the cell select signal SEL.

Even though not illustrated in FIG. 13A, the control transistor Cx may be coupled between the sensing node FD and a capacitor Cadd as illustrated in FIG. 3. The capacitor Cadd performs correlated double sampling (CDS) according to the control signal CDSC.

Figure 13B:
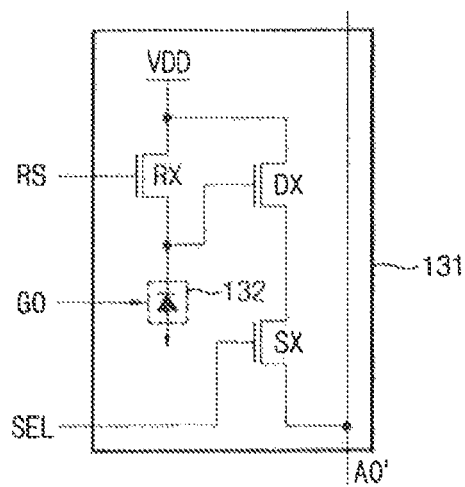
Figure 13C:
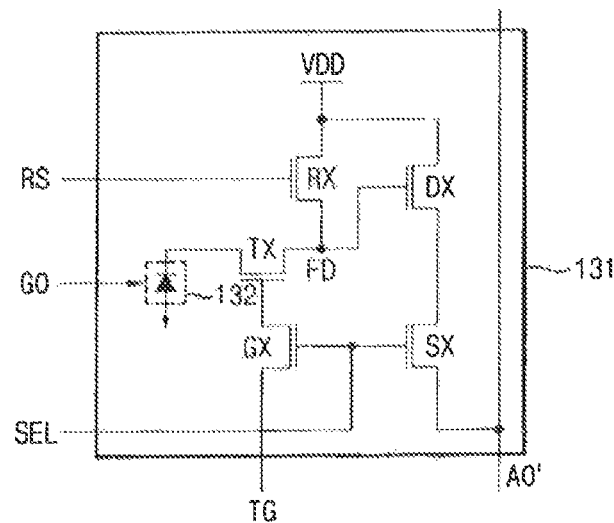
Figure 13D:
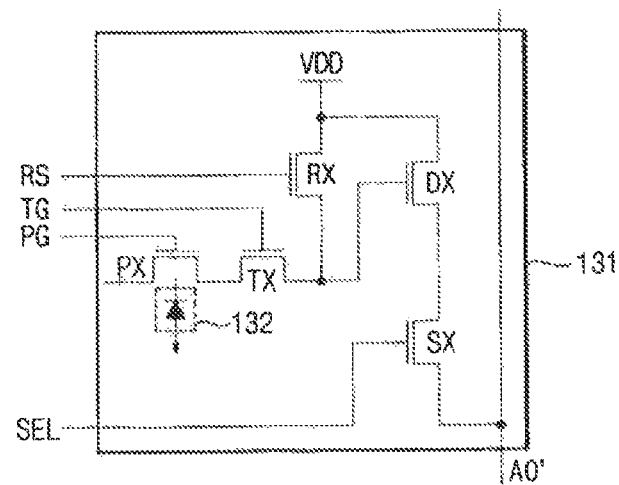

FIG. 13a illustrates a pixel circuit configuration including the one photo-conversion element 132 and four transistors TX, RX, DX and SX but the number of the transistors in each one pixel may be varied. Referring to FIG. 13b, a photo-conversion element 132 and three transistors RX, DX and SX may form one pixel in the active region 131. Compared with the configuration of FIG. 3A, the transfer transistor TX is omitted in FIG. 13B. Referring to FIG. 13C, a photo-conversion element 132 and five transistors RX, TX, DX, SX and GX may form one pixel in the active region 131. The cell select signal SEL is applied to the gates of both of the transistors GX and SX and the transfer gate signal TG is applied to the gate of the transfer transistor TX through the transistor GX that is turned ON with the cell select signal SEL. Referring to FIG. 13D, a photo-conversion element 132 and five transistors RX, TX, DX, SX and PX may form one pixel in the active region 131. The transistor PX may be operated in response to the photo gate signal PG corresponding to the masked photo-detection control signal DTC' from the photo gate controller 831.

Figure 14:
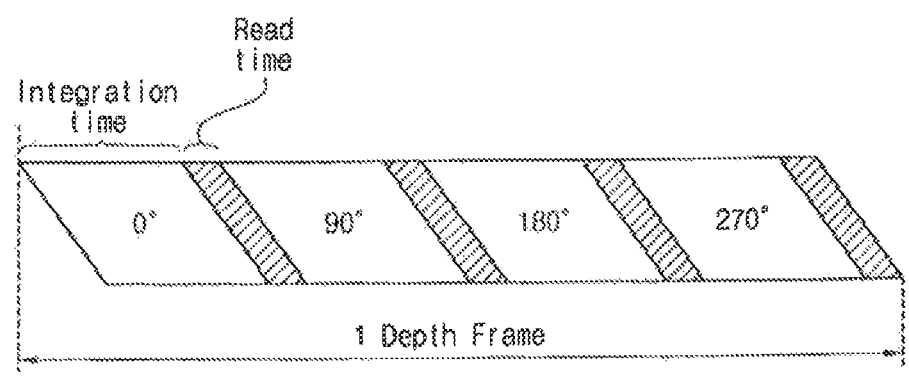
FIG. 14 is a conceptual diagram of one frame according to a rolling shutter scheme in a depth sensor including the one-tap depth-pixels of FIG. 12A.

FIG. 14 is a conceptual diagram of one frame according to a rolling shutter scheme of a depth sensor including the one-tap depth-pixels of FIG. 12A.

In FIG. 14, the phases 0, 90, 180 and 270 degrees indicate the phase differences of the corresponding photo gate signals G0 through G3 with respect to the optical signal EL. With respect to each row, the four integration operations of the generated photo-charges based on the four photo gate signals G0 and G3 and the corresponding read operations are performed in one depth frame operation. According to a rolling shutter scheme, while the operation associated with the phase difference of 0 degree are performed with respect to the bottom rows, the integration operation associated with the phase difference of 90 degrees may begin with respect to the upper rows that have completed the operation associated with the phase difference of 0 degree. This is the same between the 90-degree operation and 180-degree operation and between the 180-degree operation and the 270-degree operation.

In some exemplary embodiments, the pixel array 833 in FIG. 8 may include the depth-pixels of the two-tap structure. The configuration and the operation of the two-tap depth pixel are described with reference to FIGS. 15A through 18.

Figure 15A:
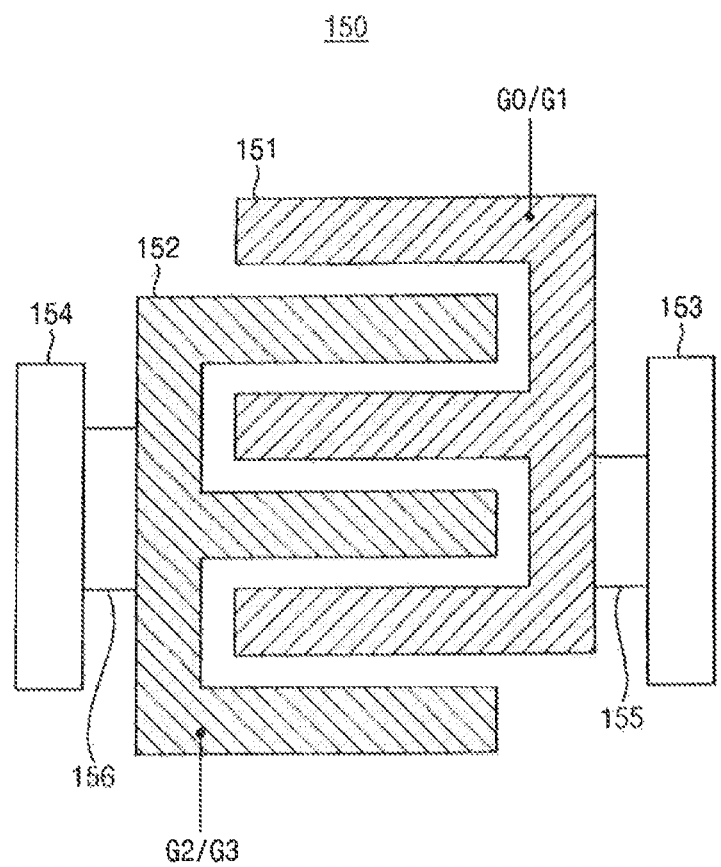
FIG. 15A illustrates an example layout of a two-tap depth pixel in the pixel array in FIG. 8.
Figure 15B:
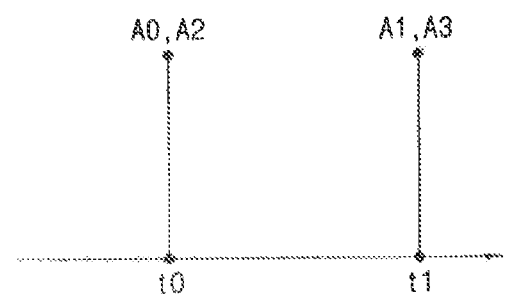
FIG. 15B is a diagram for describing phase differences between pixel signals sequentially detected by the one-tap depth pixel of FIG. 12A.

FIG. 15A illustrates an example layout of a two-tap depth pixel in the pixel array in FIG. 8, and FIG. 15B is a diagram for describing phase differences between pixel signals sequentially detected by the one-tap depth pixel of FIG. 12A.

Referring to FIG. 15A, the tow-tap depth pixel 150 may include one half pixel including a first photo gate 151, a first bridge diffusion region 155 and a first transfer transistor 153 and the other half pixel including a second photo gate 152, a second bridge diffusion region 156 and a second transfer transistor 154. The other elements present such as the reset transistors are not shown in FIG. 15A and the configuration of the two-tap depth pixel is further described with reference to FIG. 17.

Referring to FIGS. 15A and 15B, the two-tap depth pixel 150 outputs the first and third pixel signals A0 and A2 at time t0 in response to the first and third gate signals G0 and G2 respectively having the phase differences of 0 and 180 degrees, and outputs the second and fourth pixel signals A1 and A3 at time t1 in response to the second and fourth gate signals G1 and G3 respectively having the phase differences of 90 and 270 degrees. The first and second gate signals G0 and G1 are sequentially applied to the first photo gate 151, and the third and fourth gate signals G2 and G3 are sequentially applied to the second photo gate 152.

Figure 16:
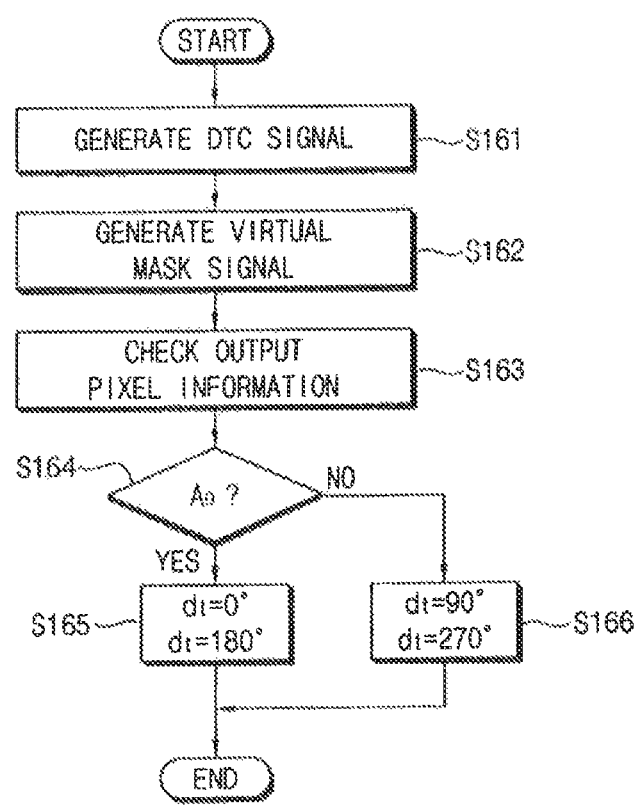
FIG. 16 is a flowchart illustrating an operation of a photo-gate controller to transfer a gate control signal to a two-tap depth pixel according to an exemplary embodiment.

FIG. 16 is a flowchart illustrating an operation of a photo-gate controller to transfer a gate control signal to a two-tap depth pixel according to an exemplary embodiment.

Referring to FIGS. 8, 10, 15A, 15B and 16, the timing controller 81 generates the first photo detection signal DTC (step S161), which is unmasked, and generates the virtual mask signal VM (step S162). The photo gate controller 831 checks the output pixel information for sensing the distance d_hat (step S163).

If the checked information corresponds to the first pixel signal A0 (step S164: YES), the photo gate controller 831 outputs the first photo gate signal G0 having the same phase (dt=0°) as the optical signal EL to the first photo gate 151 and the third photo gate signal G2 having the phase difference of 180 degrees (dt=180°) with respect to the optical signal EL to the second photo gate 152 (step S165). If the checked information does not correspond to the first pixel signal A0 (step S164: NO), the photo gate controller 831 outputs the second photo gate signal G1 having the phase difference of 90 degrees (dt=90°) with respect to the optical signal EL to the first photo gate 151 and the fourth photo gate signal G3 having the phase difference of 270 degrees (dt=270°) with respect to the optical signal EL to the second photo gate 152 (step S166).

Figure 17:
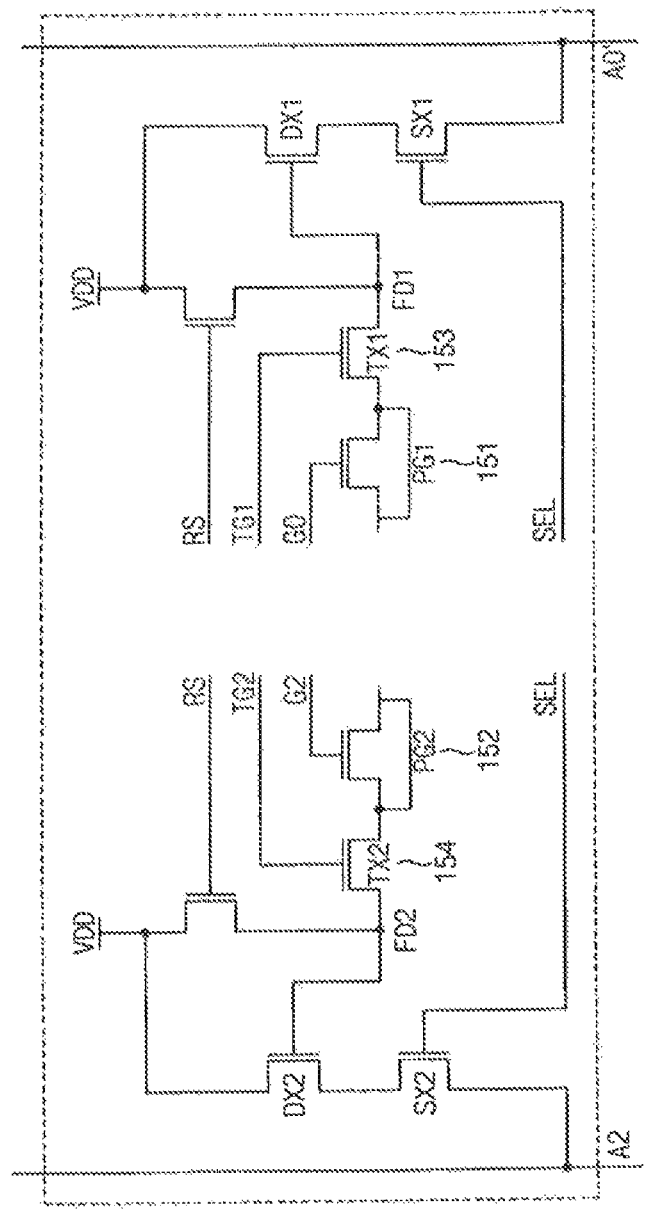
FIG. 17 is a circuit diagram illustrating an example of the two-tap depth pixel of FIG. 15A.

FIG. 17 is a circuit diagram illustrating an example of the two-tap depth pixel of FIG. 15A.

Referring to FIG. 17, the two-tap depth pixel may include a first circuit region corresponding to one half pixel and a second circuit region corresponding to the other half pixel.

For example, the first circuit region may include a first photo gate 151 and a plurality of transistors TX1 (TX), RX1 (RX), DX1 (DX) and SX1 (SX), and the second circuit region may include a second photo gate 152 and a plurality of transistors TX2 (TX), RX2 (RX), DX2 (DX) and SX2 (SX).

The first transfer transistor TX1 153, which is a transfer gate, transfers the photo-charges to the first sensing node FD1 in response to the first transfer gate signal TG1. By controlling the activation timing and the voltage level of the first transfer gate signal TG1, the back diffusion of the charges from the first sensing node FD1 to the first photo gate 151 may be prevented.

Also the second transfer transistor TX2 154, which may be a transfer gate, transfers the photo-charges to the second sensing node FD2 in response to the second transfer gate signal TG2. By controlling the activation timing and the voltage level of the second transfer gate signal TG2, the back diffusion of the charges from the second sensing node FD2 to the second photo gate 152 may be prevented.

In response to the photo gate signals G0 and G2 from the photo gate controller 831, the first and second photo gates 151 and 152 collect the photo-charges that are generated by the reflected optical signal RL. The phase difference between the first and third photo gate signals G0 and G2 is 180 degrees. After the integration operation and the read operation are completed with respect to the photo gate signals G0 and G2, the second and fourth photo gate signals G1 and G3 may be applied to the first and second photo gates 151 and 152. Also the phase difference between the second and fourth photo gate signals G1 and G3 is 180 degrees.

The transfer transistors TX1 and TX2 transfer the photo charges, which are collected under the photo gates 151 and 152, to the sensing nodes FD1 and FD2 in response to the transfer gate signals TG1 and TG2, respectively. The drive transistors DX1 and DX2 as the source follower transistors perform buffering/amplification operations in response to the charges in the sensing nodes FD1 and FD2, respectively. The select transistors SX1 and SX2 output the pixel signals A0' and A2' from the drive transistors DX1 and DX2 to the column lines in response to the cell select signal SEL. The reset transistors RX1 and RX2 reset the sensing nodes FD1 and FD2 with the voltage VDD in response to the reset control signal RS. The signals RS, TG1, TG2, G0, G2 and SEL may be provided from the timing controller 81.

Figure 18:
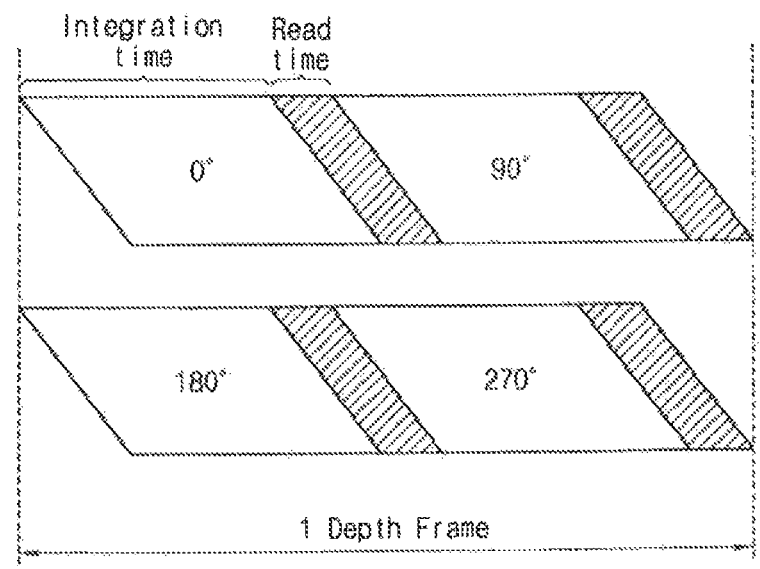
FIG. 18 is a conceptual diagram of one depth frame according to a rolling shutter scheme in a depth sensor including the two-tap depth-pixels of FIG. 15A.

FIG. 18 is a conceptual diagram of one depth frame according to a rolling shutter scheme in a depth sensor including the two-tap depth-pixels of FIG. 15A.

In FIG. 18, the phases 0, 90, 180 and 270 degrees indicate the phase differences of the corresponding photo gate signals G0 through G3 with respect to the optical signal EL. With respect to each row, the integration operations of the generated photo-charges based on the first and third photo gate signals G0 and G2 and the corresponding read operations are performed and then the integration operations of the generated photo-charges based on the second and fourth photo gate signals G1 and G3 and the corresponding read operations are performed in one depth frame operation. According to a rolling shutter scheme, while the operation associated with the phase differences of 0 and 180 degree are performed with respect to the bottom rows, the integration operation associated with the phase differences of 90 and 270 degrees may begin with respect to the upper rows that have completed the operation associated with the phase differences of 0 and 180 degrees.

FIGS. 19A through 19E illustrate examples of a unit pixel cluster included in the pixel array in FIG. 8.

Figure 19A:
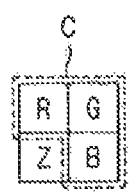
FIGS. 19A through 19E illustrate examples of a unit pixel cluster included in the pixel array in FIG. 8.
Figure 19B:
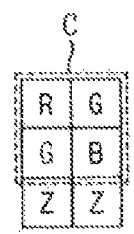
Figure 19C:
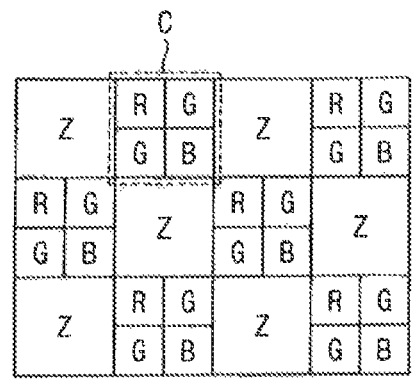

Referring to FIG. 19A, a unit pixel cluster may include a red pixel R, a green pixel G, a blue pixel B and a depth pixel Z. The red pixel R, the green pixel G and the blue pixel B may be referred to collectively as a color pixel C. The structure of the depth pixel Z may be the one-tap structure as illustrated in FIG. 12A or the two-tap structure as illustrated in FIG. 15A.

The depth pixel Z may sense the amplitude-modulated infrared light to generate the distance information. The red pixel R generates the red pixel signal corresponding to the red light wavelength among the visible light, the green pixel G generates the green pixel signal corresponding to the green light wavelength among the visible light, and blue pixel B generates the blue pixel signal corresponding to the blue light wavelength among the visible light. The R, G, and B color pixels C may be replaced with the magenta pixels, cyan pixels and yellow pixels.

Figure 19D:
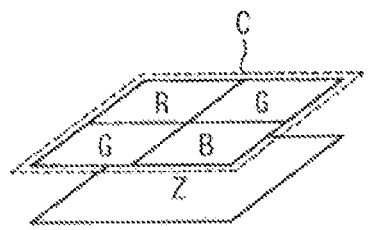
Figure 19E:
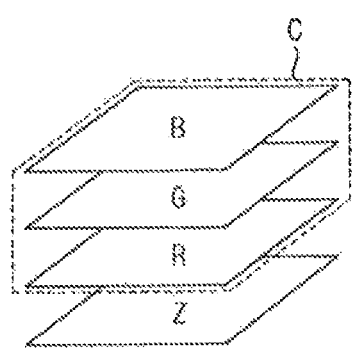

FIGS. 19A and 19E illustrate further examples of the unit pixel cluster and the unit pixel cluster may be further changed variously. The unit pixel cluster may be repeated in the row direction and/or in the column direction to form the pixel array 833. The unit pixel cluster in FIG. 19B includes the four color pixels C and the two depth-pixels Z. The unit pixel cluster in FIG. 19C includes the depth pixel that has the larger size than each color pixel. Particularly FIGS. 19D and 19E illustrate that the color pixels C and the depth-pixels Z may be stacked in layers to form three-dimensional structures.

Figure 20:
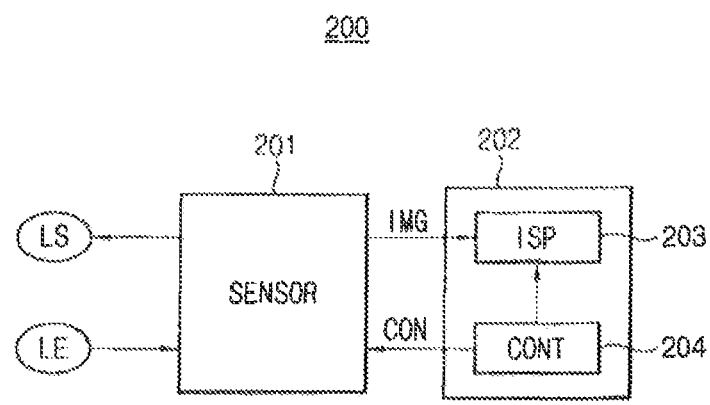
FIG. 20 is a diagram illustrating a depth and/or image sensing device according to an exemplary embodiment.

FIG. 20 is a diagram illustrating a depth and/or image sensing device according to exemplary embodiments.

Referring to FIGS. 8 and 20, a device for measuring and processing the distance information and/or the color image information may include a sensor 201 and a processor 202. The sensor 201 receives the reflected optical signal through the lens LE to provide the image information IMG including the distance information and/or the color image information. The reflected optical signal may be an infrared light radiated from the light source LS and reflected by an object. The descriptions of the sensor 201 are the same as or similar to the descriptions with reference to FIGS. 1 through 19E.

The processor 202 may include an image signal processing circuit (ISP) 203 for processing the image information IMG from the sensor 201 and a controller (CONT) 204 for controlling the sensor 201 through the control signals CON.

Figure 21:
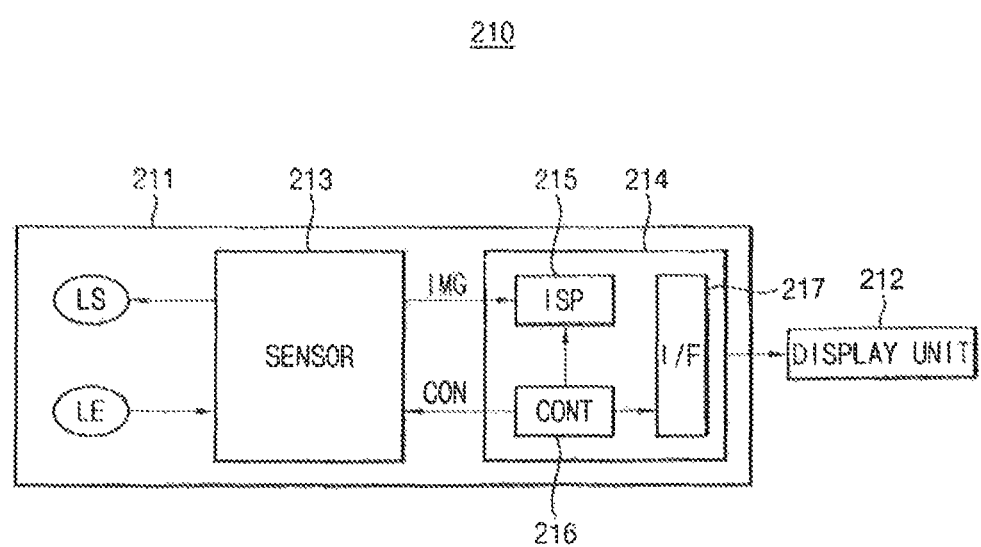
FIG. 21 is a diagram illustrating a signal processing system according to an exemplary embodiment.

FIG. 21 is a diagram illustrating a signal processing system according to an exemplary embodiment.

Referring to FIG. 21, the signal processing system may include a device 211 for measuring and processing the image information and a display unit 212 for displaying the image based on the image information from the device 211. As described with reference to FIG. 20, the device 211 may include a sensor 213 and a processor 214. The sensor 213 receives the reflected optical signal through the lens LE to provide the image information IMG. The reflected optical signal may be an infrared light radiated from the light source LS and reflected by an object. The descriptions of the sensor 213 are the same as or similar to the descriptions with reference to FIGS. 1 through 19E. The processor 214 may include an image signal processing circuit (ISP) 215 for processing the image information IMG from the sensor 201 and a controller (CONT) 216 for controlling the sensor 213 through the control signals CON. The processor 214 may further include an interface (I/F) 217 for transferring the depth and color image information to the display unit 212.

Figure 22:
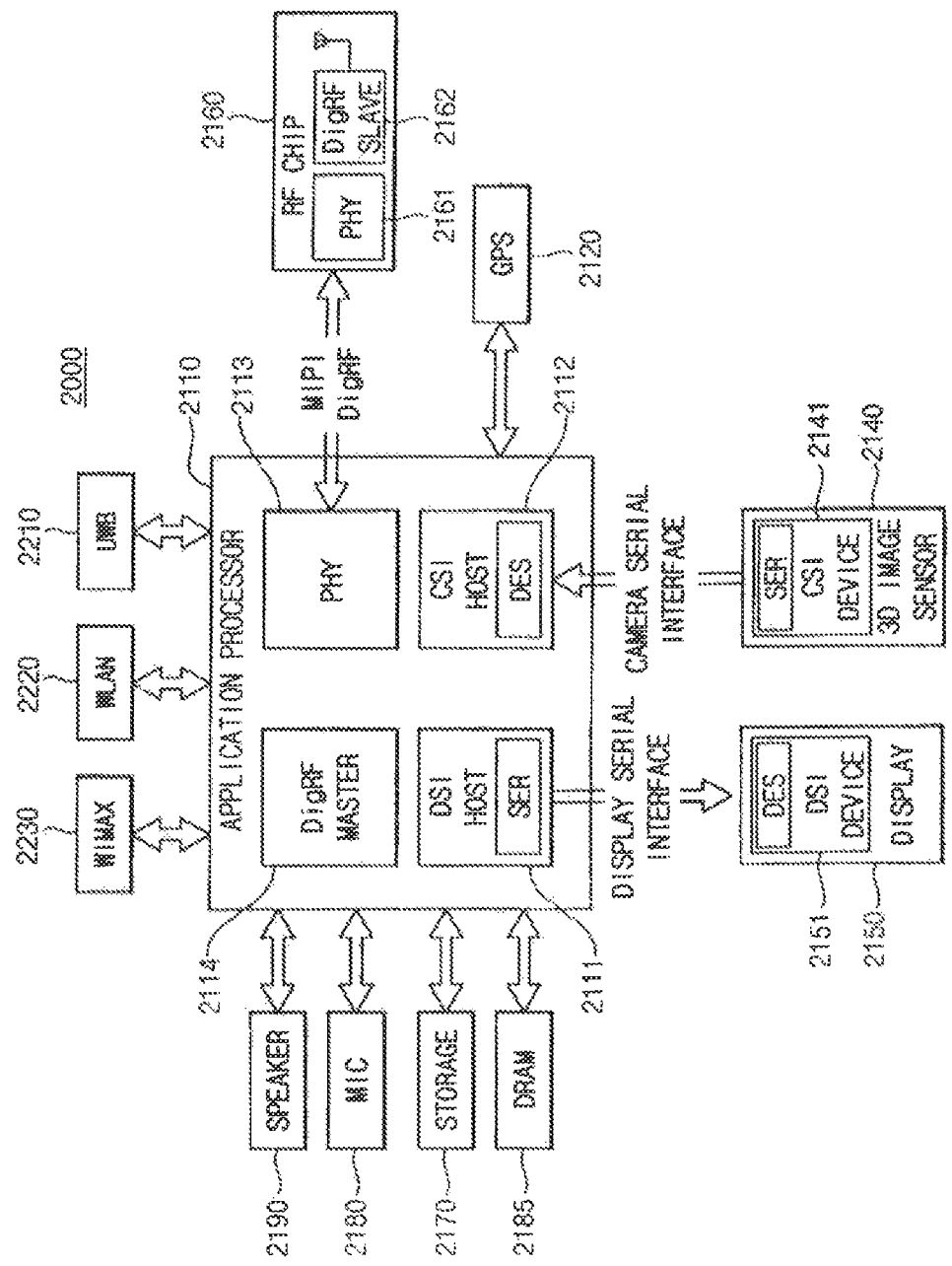
FIG. 22 illustrates an electronic system and an interface including the distance measurement device of FIG. 5 or FIG. 8.

FIG. 22 illustrates an electronic system and an interface including the distance measurement device of FIG. 5 or FIG. 8.

Referring to FIG. 22, an electronic system 2000 may be implemented by a data processing device that uses or supports a mobile industry processor interface (MIPI) interface. The electronic system 2000 may include an SOC 2110 in a form of an application processor (AP), an image sensor 2140, a display device 2150, etc. The SOC may include an interconnect device and service controllers as described above according to exemplary embodiments.

A CSI host 2112 of the SOC 2110 may perform a serial communication with a CSI device 2141 of the image sensor 2140 via a camera serial interface (CSI). In an exemplary embodiment, the CSI host 2112 may include a deserializer (DES), and the CSI device 2141 may include a serializer (SER). A DSI host 2111 of the SOC 2110 may perform a serial communication with a DSI device 2151 of the display device 2150 via a display serial interface (DSI).

In an exemplary embodiment, the DSI host 2111 may include a serializer (SER), and the DSI device 2151 may include a deserializer (DES). The electronic system 2000 may further include a radio frequency (RF) chip 2160 performing a communication with the SOC 2110. A physical layer (PHY) 2113 of the electronic system 2000 and a physical layer (PHY) 2161 of the RF chip 2160 may perform data communications based on a MIPI DigRF. The SOC 2110 may further include a DigRF MASTER 2114 that controls the data communications of the physical layer PHY 2161.

The electronic system 2000 may further include a global positioning system (GPS) 2120, storage 2170, a microphone MIC 2180, a DRAM device 2185, and a speaker 2190. In addition, the electronic system 2000 may perform communications using an ultra wideband (UWB) 2210, a wireless local area network (WLAN) 2220, a worldwide interoperability for microwave access (WIMAX) 2230, etc. However, the structure and the interface of the electronic system 2000 are not limited thereto.

A method and a device of measuring the distance to an object according to exemplary embodiments may be efficiently used in various devices and integrated in various systems. The method and the device according to exemplary embodiments may be implemented in systems such as a digital camera, a mobile phone, a PDA, APMT, a smart phone, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of measuring the distance to an object by radiating a periodic amplitude-modulated optical signal to the object and detecting the phase difference between the radiated optical signal and a reflected optical signal from the object, the method comprising:

generating a first photo-detection control signal to control the periodic amplitude-modulation of the radiated optical signal;

generating a mask signal activated at least during a shuttering duration for resetting the voltage level at a sensing node; and generating a second photo-detection control signal based on Boolean combination of the first photo-detection signal and the mask signal such that the second photo-detection signal is deactivated or masked at least during the shuttering duration.

2. The method of claim 1, wherein the distance to the object is resolved using correlated double sampling (CDS) to compensate the detected phase difference for a reset voltage level.

3. The method of claim 2, wherein the mask signal is further activated at least during an activated duration of a reset control signal while detecting the reset voltage level.

4. The method of claim 2, wherein the CDS includes a first duration for detecting a signal voltage level at the sensing node, the signal voltage level associated with the reflected optical signal, a second duration for activating a reset control signal to reset the sensing node, and a third duration for detecting the reset voltage level at the sensing node.

5. The method of claim 4, wherein the mask signal is further activated at least during the first duration, the second duration and the third duration.

6. The method of claim 5, further comprising:

after generating the second photo-detection control signal, transferring an electric charge corresponding to the reflected optical signal to the sensing node using the second photo-detection control signal.

\* \* \* \* \*